United States Patent

[11] 3,633,820

[72] Inventor Karl-Helmut Weissohn
 Essen, Germany
[21] Appl. No. 886,310
[22] Filed Dec. 18, 1969
[45] Patented Jan. 11, 1972
[73] Assignee Matthias Ludwig Industrieofenbau GmbH
 Essen, Germany
[32] Priority Dec. 21, 1968
[33] Germany
[31] P 18 16 373.0

[54] FURNACE INSTALLATION WITH COMMUTATIVE CONTROL SYSTEM
 4 Claims, 2 Drawing Figs.

[52] U.S. Cl. .................................................... 236/46 F,
 236/15 B, 236/78 A
[51] Int. Cl. .................................................... F23n 3/00
[50] Field of Search ......................................... 236/15 B,
 78 A, 78 B, 46 F; 335/138, 139, 140;
 307/141-144; 219/477, 480, 483, 486, 497, 498

[56] References Cited
 UNITED STATES PATENTS
 1,511,050 10/1924 Collins et al. ................. 236/15 B

| 1,925,463 | 9/1933 | Schmidt | 236/15 B |
| 2,495,856 | 1/1950 | Markusen | 236/78 A |
| 2,770,420 | 11/1956 | Potter et al. | 236/15 B |
| 2,849,186 | 8/1958 | Hanna | 236/15 B |
| 2,887,271 | 5/1959 | Akin et al. | 236/15 B |
| 3,319,887 | 5/1967 | Gallagher | 236/15 B |
| 3,450,343 | 6/1969 | Donath | 236/15 B |

FOREIGN PATENTS

| 894,633 | 10/1953 | Germany | 236/15 B |

Primary Examiner—William F. O'Dea
Assistant Examiner—P. D. Ferguson
Attorney—Karl F. Ross ABSTRACT: A plant for heat treating metallic bodies in a number of hood-type furnaces has a commutative control system in which a single control unit, for example a proportional comparator, is successively switched into circuit with a temperature sensor at each of the furnaces, a respective temperature controller at each of the furnaces and a temperature-setting device assigned to each of the furnaces, at a rate which is small relative to the heat treatment time of the metal goods in the furnace.

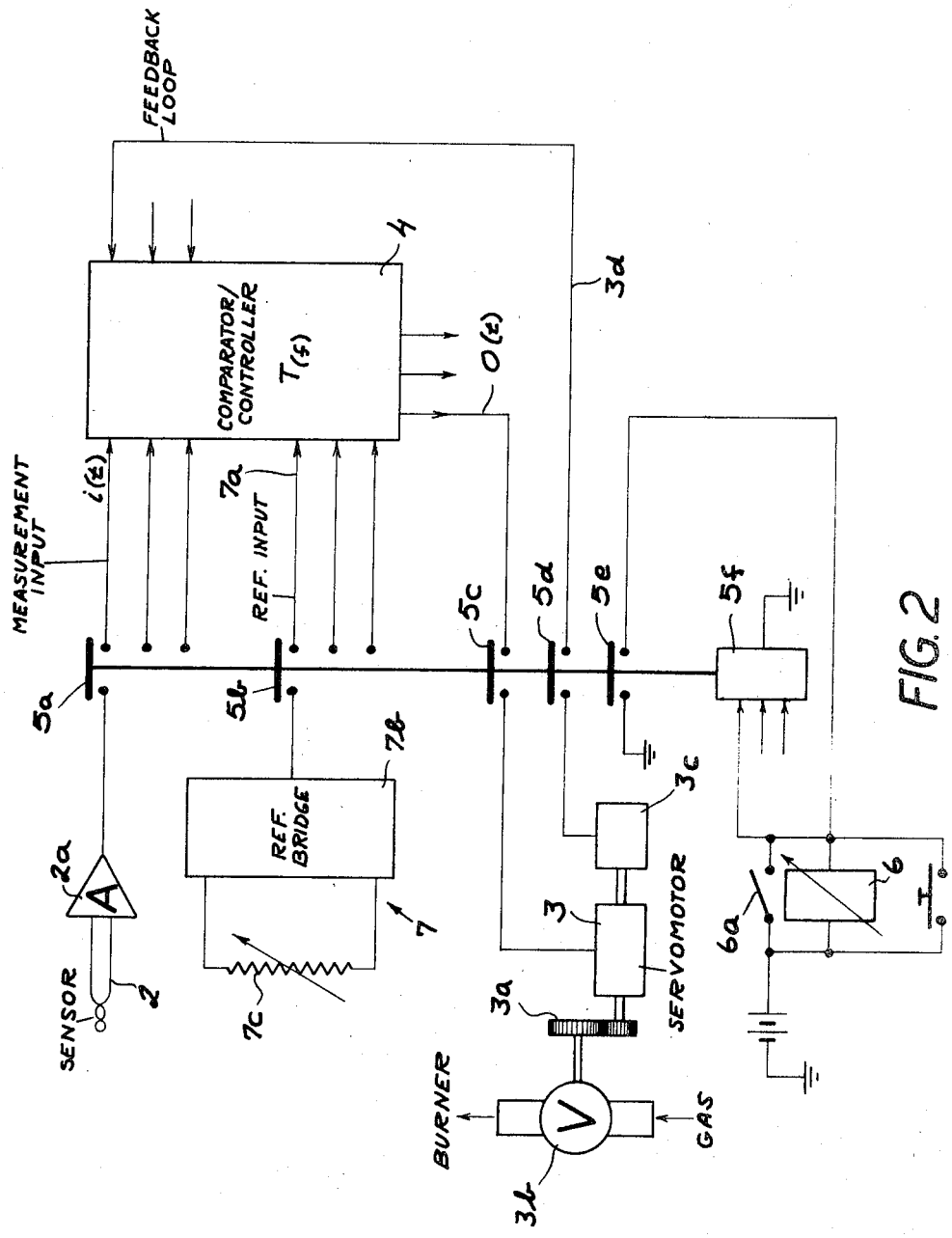

FURNACE INSTALLATION WITH COMMUTATIVE CONTROL SYSTEM

FIELD OF THE INVENTION

My present invention relates to furnace installations having a plurality of furnace chambers which may be maintained at a common temperature or at different temperatures and provided with individual controls and sensors for regulating the temperature in the heat-furnace chamber and, more particularly, to a furnace installation for the heat treatment of metal bodies having a commutative control system.

BACKGROUND OF THE INVENTION

Furnace installations having a plurality or multiplicity of furnace chambers, each maintained at a predetermined temperature, have hitherto been provided with respective temperature sensors in circuit with respective proportional control and like regulatory apparatus, and temperature-control members for maintaining the desired preset temperature in each of these furnace chambers.

Typical of such installations are heat treatment plants for metal bodies having a multiplicity of hood-type furnaces for treatment of individual metal bodies or individual groups of metal bodies. When reference is made herein to "hood-type" furnaces, it is intended to include, especially, furnaces of the configuration and construction described and claimed in the commonly owned U.S. Pat. No. 3,145,982, as well as modifications and variations of such structures wherein the statically or stationarily positioned goods are contained within a furnace enclosure heated by gas or other combustible fuel to a temperature adjustable by a regulatory member such as a fuel-control valve. Such furnaces are usually only slightly larger than the mass of goods to be contained therein and, consequently, entire banks of these furnaces may be included in the operating line of a heat treatment plant for metal bodies.

Typical of the bodies subjected to heat treatment in such furnaces, are coils of steel band adapted to be annealed subsequent to rolling or to be heated preparatorily to a further treatment. In general, the coiled band is stacked within the furnace, preferably with a slight separation between the turns, upon a platform and are closely surrounded by a hood-type cover which may be lifted to afford access to the coils at the conclusion of the heat treatment. Hot gases may be introduced into the annular space surrounding the coils and, moreover, burners for liquid (petroleum) hydrocarbons or gaseous hydrocarbon fuels may be mounted in the walls, on the platform or elsewhere in the hood-type furnace.

In reviewing control systems for such furnaces one must mention the fact that a common control unit for all of the furnaces has not hitherto been found to be practical because of variations in the heating rates of the goods in the several furnaces, the necessity of treating the goods for different times depending upon the nature of the goods, and variations in combustion rates and other parameters of the heat treatment.

Hence it has hitherto been a necessity to operate all of the furnaces of a particular line with a common control independent of the individualities of the furnaces and thereby obtain poor fuel utilization and poor control of the heat-treatment process, or to provide separate controls at each furnace at substantially increased expense, while affording the opportunity to individually regulate the temperatures in each of the furnaces.

The problem will become all the more apparent when it is recognized that it is not uncommon for a furnace installation of the character described to have two hundred or more individual heat treatment furnaces, many of which may be in a loading or discharging state while others are at various stages in heat treatment and may be used for the heat treatment of metals of different thickness, coils or bodies of different dimensions and even materials of different compositions or final properties.

OBJECTS OF THE INVENTION

It is, therefore, the principal object of the present invention to provide an improved furnace installation, especially for the heat treatment of metals wherein the aforementioned disadvantages can be obviated and accurate control of the treatment process can be maintained with relatively low capital expenditure.

A further object of this invention is to provide a control system for the temperatures of the individual furnaces of a multifurnace installation, especially for the heat treatment of metal bodies.

Yet another object of my invention is the provision of a system for accurately regulating individual temperatures at a multiplicity of hood-type furnaces, whereby different temperatures may be maintained at each of the installations.

Still a further object of the invention is the provision of a low-cost control system for the temperatures of a number of furnaces in a multifurnace installation of the general type described above which provides functional security of the heat treatment process and is free from a tendency to breakdown.

SUMMARY OF THE INVENTION

These objects and others which will become apparent hereinafter are attained, in accordance with the present invention, with a commutative control system for the temperatures of the individual furnaces of a multifurnace installation. The invention is, as previously noted, particularly adapted to hood-type furnaces for the heat treatment of metal bodies, e.g. as described in U.S. Pat. No. 3,145,982, wherein each of the individual furnaces has a temperature-sensing means responsive to the temperature within the furnace and consisting, for example, of one or more temperature sensors (e.g., thermocouples, pyrometers, resistance temperature indicators), the output of which is an electrical signal proportionate to temperature.

In addition, each of the individual furnace units is provided, in accordance with this invention, with a setpoint temperature-controlling means, preferably a temperature-control member, the displacement of which increases or decreases the temperature within the furnace. Typical of such temperature-control, regulator or controller members are fuel valves of the furnace burners, dampers for regulating the flow of hot gases into the furnace chamber and the like.

In addition, the system of the present invention provides a single controller assigned to all of the furnaces of a particular control line, each control line comprising a multiplicity of such furnaces and possibly all of the several furnaces of a particular furnace installation. The controller, which may be a proportional controller having a comparator stage in which the sensed condition or controlled variable is compared with a reference or setpoint valve and an output stage providing a control signal upon variation of the sensed signal from the reference, and possibly a feedback loop for further regulating the operation of the regulators, is common to a number of temperature sensors and a number of temperature regulators, the sensors and regulating members being paired at the respective furnaces.

The control unit of this invention, preferably a proportional controller as described above, is successively connected to the respective sensors of the furnaces and simultaneously to the corresponding temperature controller and reference sources by a commutating or scanning device such as an electronic or electromechanical stepping switch adapted to commutate the control unit between the sensors of the successive furnace chambers, the reference sources of the respective furnace chambers and the temperature controllers of the respective furnace chambers.

In other words the control of the temperature of each individual furnace is effected over a fraction of the cycling time of the commutating device, during which period a control circuit is established between the sensor, the control unit and the temperature-regulating member. After the lapse of this interval, the commutating or scanning device switches the controller to establish a new circuit with the sensor and regulating member of a successive furnace.

The invention is based upon the recognition that the transfer function for control of the individual furnaces of a given control line is identical in spite of the fact that the inputs of the control units may vary from furnace to furnace depending upon the prior history of heat treatment of the goods therein, upon the nature of the goods and upon other heat treatment parameters.

The output of the control unit will, however, bear the relationship to the input established by the transfer function, but will have the values necessary to adjust the particular furnace whose input was sensed or monitored. The outputs, consequently, will differ from furnace to furnace, as will the inputs, while the transfer function, being determined exclusively by the control unit, will remain the same. The "transfer function" is the ratio of the output to the input of the controller and is exclusively determined by the circuitry of the control unit so that the relationship between input (considering any reference input to be combined with that of the temperature sensor) $i(t)$ and the output $o(t)$ is generally defined by the relation $o(t)=T(f) i(t)$ where $T(f)$ is the transfer function of the control unit.

It will also be understood that, in accordance with automatic-control concepts, the form of the output signal will be the form of the input signal with a gain determined by the transfer function. It is, however, important to maintain the ratio of the dead time $T_t$ to the time constant $T_s$ of the transfer function, relatively small for example 1:6 to 1:10. This is not difficult in furnace systems of the type contemplated in accordance with the present invention since heat treatment of metal bodies in the aforementioned hood-type furnaces requires periods of the order of hours and frequently treatment times of 20 hours or more.

The interval during which each furnace is monitored according to the present invention, should be of the order of seconds, preferably 5 to 30 seconds and will depend, of course, upon the number of furnaces to be monitored as well as upon the time constant of the control unit mentioned earlier. As a rule, the furnaces should be cyclically monitored at periods of the order of minutes, e.g. each 5 to 30 minutes. For example, with a monitoring interval of about 15 seconds, a furnace installation having 30 furnaces will be cyclically monitored with a period of about 7.5 minutes, a period which is small by comparison to the heat treatment time as noted earlier.

While the invention may be practiced using various types of control units and systems including continuous controllers or discontinuous controllers, it has been found to be most desirable to make use of so-called P-control systems of the proportional-control type. It will be understood, however, that in some cases it may be desirable to use P-I regulators of the proportional-action integral floating-action type or PID controllers with a derivative stage. However, when PI or PID controllers are used, I prefer to make use only of the P sections thereof.

The commutating device or scanning means, in accordance with this invention, is preferably an electromechanical stepping switch which is advanced from step to step by time-delay relay means which may be provided directly upon the stepping switch and permits the monitoring cycle of each furnace to be varied further to ensure the proper relationship between the monitoring interval and the cycling time of the commutating switch. Instead of a stepping-switch arrangement, a series type of relay system may be provided in which individual time-delay relays control the monitoring time for each furnace before passing the controller connection on to a successive furnace circuit.

It has also been found to be important, for comparison with the inputs, to provide either a single reference source connected with the control unit or a respective reference for each of the furnaces of the control line and to connect this reference input to the controller simultaneously with the switching of the corresponding sensor and regulator into circuit with the controller. A highly effective individual control is thereby obtained.

DESCRIPTION OF THE DRAWING

The above and other objects, features and advantages will become more readily apparent from the following description, reference being made to the accompanying drawing in which:

FIG. 2 is a diagram of the individual monitoring circuit established for each furnace in each position of the commutating device.

SPECIFIC DESCRIPTION

Figure 1:
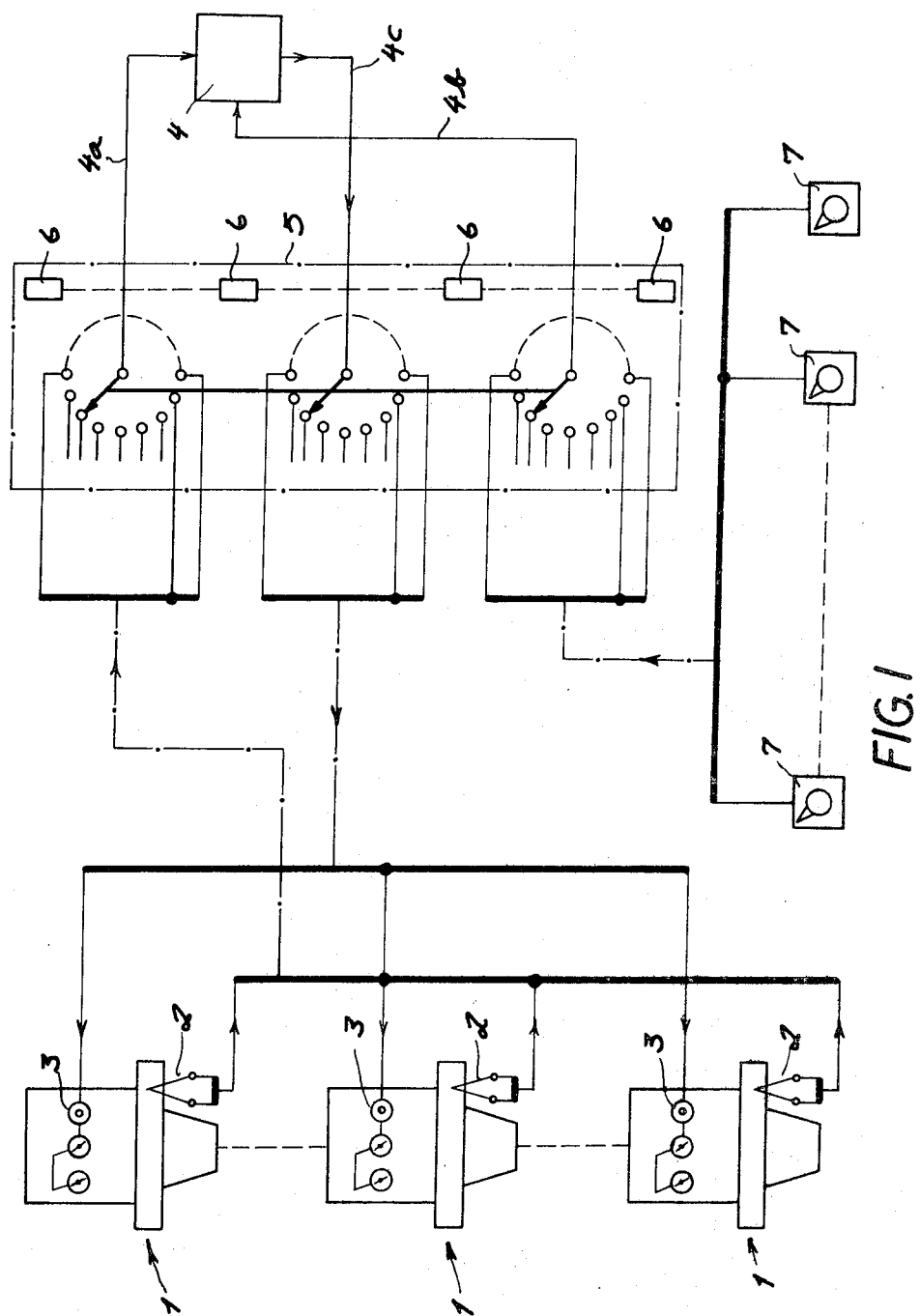
FIG. 1 is a schematic diagram illustrating the control system of the present invention.

In FIG. 1 of the drawing, I have shown a furnace installation having a plurality of individually heated hood-type furnaces 1 for the heat treatment of metal bodies such as coils of band or sheet steel. The coils may be stacked within the furnace or otherwise positioned therein as described in U.S. Pat. No. 3,145,982.

The furnaces 1 are each provided with a respective temperature-sensing means, here represented as a thermocouple 2 adapted to provide the input to a control unit 4 of the comparator and proportional regulator type. The temperature sensor 2 is of the kind described at pages 22-8 of Perry's Chemical Engineers' Handbook, McGraw-Hill Book Co., New York (4th Edition, 1963). Each of the furnaces 1 is, moreover, provided with a temperature-control member 3 of the electrical servomotor type, i.e. to control a fuel valve, the servomotor 3 being of the kind described at pages 276-284 of Servomechanism Practice, McGraw-Hill Book Co. (2nd Edition, 1960). The comparator/controller 4 can be of the kind described at pages 4ff of Servomechanism Practice.

In the system illustrated in FIG. 1, only a single control circuit 4 is provided, this in circuit with the wipers of a multistage electromechanical stepping switch illustrated diagrammatically at 5. The stepping switch 5 is provided with timing devices 6 by means of which the individual working times of the furnaces are adjustable. Furthermore, a succession of reference inputs is provided in the form of the reference potentiometers 7 which are each associated with a respective furnace. For each of the furnaces in succession, therefore, an input 4a is provided from the temperature sensor and an input 4b is provided for the respective reference potentiometer 7, with the output 4c being communicated by the appropriate switch contacts to the corresponding servomotor 3.

In FIG. 2 there is shown an individual circuit for any of the furnaces which is formed when, for example, the contacts 5a, 5b, 5c, 5d and 5e of the stepping switch close to connect the comparator/controller 4 with the transfer function $T(f)$ to the respective furnace.

In the usual case, the thermocouple 2 will form the input to an amplifier 2a, the output of which forms the measurement input with the signal value $i(t)$ applied to the controller 4. The reference input is a constant applied at line 7a from a wheatstone bridge 7b, for example, with the potentiometer 7c and is adjustable in accordance with the temperature desired in the particular furnace. The output $o(t)$ is applied via the contacts 5c to the servomotor 3 which may be connected by a speed-reducing transmission 3a with a valve 3b controlling the gas flow to the burner of the respective furnace. In addition, a position-responsive device 3c (see Servomechanism Practice) may be used to apply a feedback at 3d to the controller thereby ensuring appropriate setting of the servomotor in proportional control. The adjustable time delay relay 6 is triggered by a contact 5e of the stepping switch when the latter is advanced, but closes its contact 6a only after the lapse of a preset period selected for monitoring of the particular furnace in accordance with the considerations set forth earlier. When contact 6a closes, therefore, the coil 5f of the stepping switch is energized and the commutating device connects another furnace to the controller 4.

The invention described and illustrated herein is believed to admit of many modifications which will be readily apparent to those skilled in the art and are intended to be included within the spirit and scope of the appended claims.

I claim:

1. A method of controlling the temperatures of a group of hood-type furnaces, comprising the steps of:
    monitoring the temperature in each of said furnaces for producing a respective controlled-variable value;
    establishing an individual adjustable setpoint value for each of said furnaces independently of the others;
    applying the setpoint value and the controlled-variable value of each of said furnaces, in succession, to a single proportional controller for regulating the temperature of each furnace in accordance with the respective setpoint value by commutating the setpoint values and controlled-variable values to said proportional controller;
    establishing a predetermined control time interval individual to each of said furnaces and independently of the others; and
    maintaining the respective setpoint value and controlled-variable value at said proportional controller for the respective interval and thereafter triggering the commutation of each successive setpoint value and controlled-variable value to said proportional controller upon the lapse of said interval.

2. The method defined in claim 1 wherein said interval is small compared with the operating duration of each of said furnaces and said proportional controller has a predetermined transfer function relating setpoint value input and controlled-variable value input to a temperature-controlling output, the ratio of the dead time of the controller to the time constant of the transfer function ranging between 1:6 and 1:10, each of said furnaces being monitored with a period equal to substantially the sum of the respective intervals.

3. A furnace installation comprising a plurality of furnaces each provided with a respective temperature sensor for producing a respective controlled-variable value;
    a respective temperature-setting means for establishing a setpoint value individual to each furnace;
    a single proportional controller having a transfer function relating input values to a temperature-control output value and common to all of said furnaces;
    switch means for commutating each setpoint value and controlled-variable value to said proportional controller for regulation of the temperature in the respective furnace over a predetermined time interval independently of the condition in the other furnaces; and
    adjustable timer means establishing said interval for each of said furnaces for commutating the setpoint and controlled-variable values of a successive furnace to said proportional controller upon the lapse of the interval at each preceding furnace, thereby cyclically controlling the temperatures at said furnaces.

4. The installation defined in claim 3 wherein said furnaces are hood-type furnaces, said timer means being adjustable time-delay devices individual to said furnaces.

* * * * *